United States Patent
Won et al.

(10) Patent No.: US 9,808,786 B2
(45) Date of Patent: Nov. 7, 2017

(54) PREPARATION METHOD OF SUPERABSORBENT POLYMER

(71) Applicant: LG Chem, Ltd., Seoul (KR)

(72) Inventors: Tae Young Won, Daejeon (KR); Jin Hyun Bae, Daejeon (KR); Jun Kyu Kim, Daejeon (KR); Jong Hyuk Kwon, Daejeon (KR); Young Jae Hur, Daejeon (KR); Yun Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/779,533

(22) PCT Filed: Sep. 12, 2014

(86) PCT No.: PCT/KR2014/008533
§ 371 (c)(1),
(2) Date: Sep. 23, 2015

(87) PCT Pub. No.: WO2015/041432
PCT Pub. Date: Mar. 26, 2015

(65) Prior Publication Data
US 2016/0045895 A1    Feb. 18, 2016

(30) Foreign Application Priority Data

Sep. 17, 2013    (KR) ........................ 10-2013-0112030

(51) Int. Cl.
*B01J 20/00*    (2006.01)
*B01J 20/30*    (2006.01)
(Continued)

(52) U.S. Cl.
CPC ......... *B01J 20/3085* (2013.01); *B01J 20/267* (2013.01); *B01J 20/3021* (2013.01);
(Continued)

(58) Field of Classification Search
None
See application file for complete search history.

(56) References Cited

U.S. PATENT DOCUMENTS 5,250,640 A    10/1993   Irie et al.
5,342,899 A     8/1994   Graham et al.
(Continued)

FOREIGN PATENT DOCUMENTS

EP    1690887 A1    8/2006
EP    2615119 A1    7/2013
(Continued)

OTHER PUBLICATIONS

Extended Search Report from European Application No. 14846318.5, dated May 31, 2016.
(Continued)

*Primary Examiner* — Robert C Boyle
(74) *Attorney, Agent, or Firm* — Lerner, David, Littenberg, Krumholz & Mentlik, LLP (57) ABSTRACT

A method of preparing a superabsorbent polymer is provided, which is able to improve physical properties and to recycle fine powder generated during the preparation process. Particularly, a method of preparing a superabsorbent polymer capable of improving physical properties by using a base resin including a water-containing gel polymer and a base-treated fine powder regranulated body, which are different from each other in degree of neutralization, during preparation of the superabsorbent polymer, is provided.

10 Claims, 1 Drawing Sheet

(51) Int. Cl.
  *C08F 20/10* (2006.01)
  *B01J 20/26* (2006.01)
  *C08J 3/24* (2006.01)
(52) U.S. Cl.
  CPC ............... *C08F 20/10* (2013.01); *C08J 3/245* (2013.01); *C08J 2333/02* (2013.01)

(56) References Cited

U.S. PATENT DOCUMENTS

| | | | |
|---|---|---|---|
| 2005/0245393 | A1 | 11/2005 | Herfert et al. |
| 2010/0099781 | A1* | 4/2010 | Tian ..................... C08F 265/04 521/40.5 |
| 2011/0118430 | A1 | 5/2011 | Funk et al. |
| 2012/0220745 | A1 | 8/2012 | Machida et al. |
| 2012/0258851 | A1 | 10/2012 | Nakatsuru et al. |
| 2014/0051813 | A1 | 2/2014 | Won et al. |

FOREIGN PATENT DOCUMENTS

| | | |
|---|---|---|
| JP | H05112654 A | 5/1993 |
| JP | 2006143836 A | 6/2006 |
| KR | 100231077 B1 | 11/1999 |
| KR | 20050036975 A | 4/2005 |
| KR | 20100040252 A | 4/2010 |
| KR | 20110087293 A | 8/2011 |
| KR | 20110111938 A | 10/2011 |
| KR | 20120059169 A | 6/2012 |
| KR | 20120132475 A | 12/2012 |
| WO | 2008038840 A1 | 4/2008 |
| WO | 2010006937 A1 | 1/2010 |
| WO | 2010046267 A1 | 4/2010 |
| WO | 2011034147 A1 | 3/2011 |
| WO | 2012074254 A2 | 6/2012 |
| WO | WO 2012/074254 * | 6/2012 |

OTHER PUBLICATIONS

Third Party Observation from European Application No. 14846318.5, dated Jan. 25, 2016.
Third Party Observation from PCT/KR2014/008533, dated Jan. 14, 2016.
International Search Report for Application No. PCT/KR2014/008533 dated Dec. 22, 2014.

* cited by examiner

PREPARATION METHOD OF SUPERABSORBENT POLYMER

CROSS REFERENCE TO RELATED APPLICATIONS

The present application is a national phase entry under 35 U.S.C §371 of International Application No.PCT/KR2014/008533 filed Sep. 12, 2014, which claims the benefit of Korean Patent Application No.10-2013-0112030, filed Sep. 17, 2013. The disclosures of said applications are incorporated by reference herein.

TECHNICAL FIELD

The present invention relates to a preparation method of a superabsorbent polymer having improved physical properties.

BACKGROUND ART

A superabsorbent polymer (SAP) is a type of synthetic polymeric material capable of absorbing moisture from 500 to 1000 times its own weight. Various manufacturers have denominated it as different names, such as SAM (Super Absorbency Material), AGM (Absorbent Gel Material), etc. Since such superabsorbent polymers started to be practically applied in sanitary products, now they have been widely used not only for hygiene products such as disposable diapers for children, etc., but also for water retaining soil products for gardening, water stop materials for civil engineering and construction, sheets for raising seedling, freshkeeping agents for food distribution fields, materials for poultices, or the like.

Such superabsorbent polymers may be prepared by polymerization, drying, pulverization, sorting, and surface-crosslinking processes. Upon surface-crosslinking, a solution including a surface-crosslinking agent is generally sprayed onto the pulverized polymer. In this regard, particle size distribution of the superabsorbent polymer is important.

Due to a surface area difference depending on particle size, non-uniformity may be caused by the surface treatment solution. Therefore, to minimize distribution of the surface treatment solution, a powder is controlled to have a particle size of 150 to 850 μm and then surface treatment is performed. Further, a powder having a particle size of smaller than 150 μm is not subjected to surface treatment, but is recycled to a polymerization reactor or a monomer solution, or another process.

However, a product of 150 μm or smaller formed during pulverization, in particular, a fine powder of 150 μm undergoes an additional crosslinking reaction at a primary drying temperature due to the surface-crosslinking agent remaining during recycling, and thus undergoes a secondary surface-crosslinking reaction during the surface-crosslinking process, resulting in deterioration of physical properties.

DISCLOSURE

Technical Problem

An object of the present invention is to provide a method of efficiently preparing a superabsorbent polymer with excellent physical properties, in which a base resin including a mixture of a water-containing gel polymer and a base-treated fine powder regranulated body having degree of neutralization of two or more, being different from each other in surface-crosslinking rate is used so as to prevent deterioration of the physical properties during the surface crosslinking process.

Technical Solution

The present invention provides a method of preparing a superabsorbent polymer, including the steps of:

forming a monomer composition including water-soluble ethylenic unsaturated monomers and a polymerization initiator;

polymerizing the monomer composition in a polymerization reactor so as to prepare a water-containing gel polymer;

mixing the water-containing gel polymer and a base-treated fine powder regranulated body which are different from each other in degree of neutralization;

drying and pulverizing a mixture of the water-containing gel polymer and the base-treated fine powder regranulated body;

sorting the pulverized mixture so as to prepare a base resin; and surface-treating the base resin.

The base-treated fine powder regranulated body may be obtained by drying, pulverizing, and sorting the water-containing gel polymer obtained from the polymerization process, and then treating the resulting fine powder polymer having a particle size of smaller than 150 μm with an alkaline solution, followed by regranulation.

The alkaline solution is preferably one or more solutions selected from the group consisting of NaOH, $Na_2CO_3$, and $NaHCO_3$ having a concentration of 1 to 10% by weight.

The water-containing gel polymer has a degree of neutralization of 70 to 80 mol %, and the base-treated fine powder regranulated body has a degree of neutralization of 71 to 100 mol %, in which the water-containing gel polymer and the base-treated fine powder regranulated body are different from each other in the degree of neutralization.

The water-containing gel polymer and the base-treated fine powder regranulated body may have a water content of 40 to 60% by weight. Further, the water-containing gel polymer and the base-treated fine powder regranulated body may be mixed at a weight ratio of 95:5 to 70:30.

The surface treatment step may include the step of surface-treating the base resin with a surface treatment solution including a surface-crosslinking agent which is a diol or glycol-based compound having 2 to 8 carbon atoms, an alcohol or glycol-based compound having 3 or more carbon atoms and a boiling point of 90° C. or higher, and water.

The surface treatment solution may include the surface-crosslinking agent at 0.1 to 20% by weight, the alcohol or glycol-based solvent at 10 to 70% by weight, and water at a residual amount.

The surface treatment step may include the step of surface-crosslinking the mixture of the water-containing gel polymers at a temperature of 150 to 300° C. for 20 to 90 min.

The surface-crosslinking agent may be a diol or glycol-based compound having 2 to 8 carbon atoms, and is preferably one or more selected from the group consisting of 1,3-propanediol, 2,3,4-trimethyl-1,3-pentanediol, 2-butene-1,4-diol, 1,4-butanediol, 1,3-butanediol, 1,5-pentanediol, 1,6-hexanediol, 1,2-cyclohexanedimethanol, monoethylene glycol, diethylene glycol, triethylene glycol, tetraethylene glycol, polyethylene glycol, propylene glycol, dipropylene glycol, polypropylene glycol, glycerol, and polyglycerol.

The alcohol or glycol-based compound may be one or more selected from the group consisting of normal-propanol, butanol, propylene glycol, and propanediol.

The water-soluble ethylenic unsaturated monomer may be one or more selected from the group consisting of an anionic monomer such as acrylic acid, methacrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, or 2-(meth)acrylamide-2-methyl propane sulfonic acid, and salts thereof; a nonionic hydrophilic monomer such as (meth)acrylamide, N-substituted (meth)acrylate, 2-hydroxyethyl (meth)acrylate, 2-hydroxypropyl(meth)acrylate, methoxy polyethylene glycol (meth)acrylate, or polyethylene glycol (meth)acrylate; and an amino group-containing unsaturated monomer such as (N,N)-dimethylaminoethyl(meth)acrylate or (N,N)-dimethylaminopropyl(meth)acrylamide, and a quaternary compound thereof.

The polymerization initiator may be any one selected from the group consisting of an azo-based initiator, a peroxide-based initiator, a redox-based initiator, an organic halide-based initiator, a persulfate-based initiator, acetophenone, benzoin, benzophenone, a benzyl-based compound, and derivatives thereof.

The sorting step may include the step of sorting the pulverized water-containing gel polymer into two kinds of particles: a particle having a particle size of smaller than 150 μm and a particle having a particle size of 150 μm or larger to 850 μm or smaller.

Effect of the Invention

In the present invention, a superabsorbent polymer is prepared by using a base resin having degree of neutralization of two or more, being different from each other in surface crosslinking rate. Therefore, it is possible to improve physical properties of the superabsorbent polymer and to recycle the fine powder, thereby minimizing deterioration of physical properties.

DETAILED DESCRIPTION OF THE EMBODIMENTS

Figure 1:
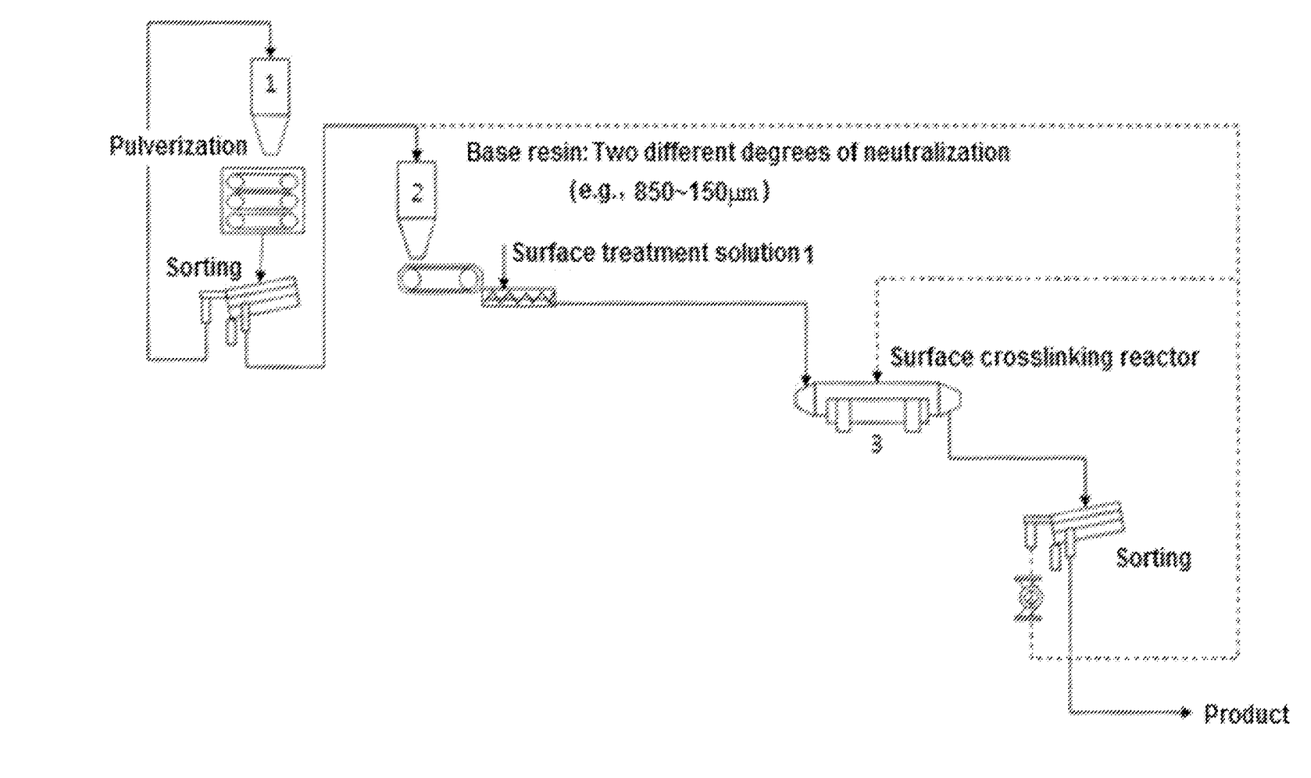
The FIGURE is a schematic illustration showing a preparation process of a superabsorbent polymer according to an embodiment of the present invention.

Hereinafter, a preparation method of a superabsorbent polymer according to specific embodiments of the present invention will be described in detail.

According to an embodiment of the present invention, a method of preparing a superabsorbent polymer is provided, including the steps of: forming a monomer composition including water-soluble ethylenic unsaturated monomers and a polymerization initiator; polymerizing the monomer composition in a polymerization reactor so as to prepare a water-containing gel polymer; mixing the water-containing gel polymer and a base-treated fine powder regranulated body which are different from each other in degree of neutralization; drying and pulverizing a mixture of the water-containing gel polymer and the base-treated fine powder regranulated body; sorting the pulverized mixture so as to prepare a base resin; and surface-treating the base resin.

In the method of preparing a superabsorbent polymer including polymerization, drying, pulverization, and surface-crosslinking processes of the present invention, two or more materials being different from each other in degree of neutralization are used as a base resin to perform surface crosslinking after the pulverization process, thereby improving the overall properties of the superabsorbent polymer. Further, since the base resin of the present invention includes a fine powder regranulated body, recycling of the fine powder is possible, thereby minimizing deterioration of physical properties.

More specifically, the fine powder regranulated body included in the base resin is obtained by base-treatment of fine powder that is generated in the preparation process of the water-containing gel polymer.

Preferably, the base-treated fine powder regranulated body may be obtained by drying, pulverizing, and sorting the water-containing gel polymer produced in the polymerization process to obtain a polymer of fine powder having a particle size of smaller than 150 μm, and then treating the polymer with an alkaline solution, followed by regranulation.

Therefore, the base resin of the present invention includes the water-containing gel polymer and base-treated fine powder regranulated body.

In this regard, the water-containing gel polymer of fine powder having a particle size of smaller than 150 μm is generated in the preparation process of the water-containing gel polymer by polymerization of the above-described monomer composition. In general, the water-containing gel polymer of a fine powder is recycled to the polymerization reactor or the monomer solution without surface treatment.

In the present invention, however, the water-containing gel polymer of a fine powder is treated with a base such as an alkaline solution and then regranulated, and therefore its degree of neutralization is different from that of the previously prepared water-containing gel polymer. Next, in the present invention, the base-treated fine powder regranulated body is mixed with the water-containing gel polymer, and this mixture is used as the base resin.

In the present invention, therefore, physical properties such as absorbency under pressure (AUP), absorption capacity under no load (CRC), etc. are improved, compared to the conventional method, and the water-containing gel polymer of a fine powder may be effectively recycled.

Meanwhile, the alkaline solution is preferably one or more solutions selected from the group consisting of NaOH, $Na_2CO_3$, and $NaHCO_3$ having a concentration of 1 to 10% by weight.

Further, the water-containing gel polymer has a degree of neutralization of 70 to 80 mol %, and the base-treated fine powder regranulated body has a degree of neutralization of 71 to 100 mol %, in which the water-containing gel polymer and the base-treated fine powder regranulated body are different from each other in the degree of neutralization.

The water-containing gel polymer and the base-treated fine powder regranulated body may have a water content of 40 to 60% by weight.

Further, the water-containing gel polymer and the base-treated fine powder regranulated body may be mixed at a weight ratio of 95:5 to 70:30. In this regard, the mixing ratio is not particularly limited. However, as the ratio of the fine powder regranulated body to the water-containing gel polymer is increased, the physical properties may be deteriorated, and thus it is preferable that the content of the base-treated fine powder regranulated body does not exceed 30% by weight.

The preparation method of the superabsorbent polymer of an embodiment of the present invention is preferably performed as illustrated in the FIGURE.

In the present invention, as shown in the FIGURE, the monomer composition is polymerized in a polymerization reactor 1 so as to prepare the water-containing gel polymer, which is dried, pulverized, and sorted, and then transferred to a base resin storage tank 2.

In this regard, the water-containing gel polymer of a fine powder having a particle size of smaller than 150 μm which is obtained by the sorting process is treated with a base, and the treated fine powder is regranulated and fed to a base resin storage tank 2. As the base, an alkaline solution is preferably used. For example, one or more solutions selected from the group consisting of NaOH, $Na_2CO_3$, and $NaHCO_3$ having a concentration of 1 to 10% by weight may be used. More preferably, the alkaline solution may include a NaOH solution at 1 to 10% by weight or a NaOH solution at 5 to 10% by weight.

As a result of these procedures, a mixture of the water-containing gel polymer and the base-treated fine powder regranulated body which are different from each other in the degree of neutralization is included in the base resin storage tank 2.

Thereafter, the mixture included in the base resin storage tank 2 is passed through the container including a surface treatment solution, and transferred to a surface crosslinking reactor 3 to allow a surface crosslinking reaction. Next, after completion of the surface crosslinking reaction, the sorting process is performed, and finally a product is manufactured.

After completion of the surface crosslinking reaction, a general drying process may be further performed before the sorting process, and conditions thereof are not particularly limited.

The water-containing gel polymer prepared in the polymerization reactor 1 may be subjected to a drying process before pulverization, but this procedure is omitted in the drawing.

In the present invention, as the base resin, a general base resin is not used, but the fine powder regranulated body having a particle size of smaller than 150 μm which is treated with an alkaline solution is used together with the water-containing gel polymer which is primarily prepared in the polymerization reactor, as described above. Therefore, surface treatment may be more efficiently performed to achieve improvement in physical properties of the superabsorbent polymer. Further, before the surface crosslinking reaction, the base-treated fine powder regranulated body and the water-containing gel polymer which are different from each other in degree of neutralization are mixed, and then subjected to the surface crosslinking reaction. Thus, additional reaction by the residual surface-crosslinking agent as in the conventional method may be prevented, thereby preventing deterioration in physical properties.

Treatment of the water-containing gel polymer of a fine powder having a particle size of smaller than 150 μm with the alkaline solution is preferably performed by spraying the alkaline solution or immersing the polymer in the alkaline solution under conditions of a temperature of 150 to 300° C. for 30 to 90 min.

Meanwhile, the surface treatment step of the present invention may be performed by a surface crosslinking reaction using a surface treatment solution including predetermined components.

According to a preferred embodiment, the surface crosslinking solution of the present invention includes a solvent and a surface-crosslinking agent. The solvent includes an alcohol or glycol-based compound having a particular boiling point, together with water.

Specifically, the solvent included in the surface crosslinking solution may be alcohols together with water. Conventionally, a solvent having a low boiling point such as methanol, ethanol, etc. is used. The present invention is similar to the conventional method in terms of using a solvent mixture of water and alcohols. However, the present invention is characterized in that the surface-crosslinking solution suitable for the process of the present invention includes a solvent having a boiling point of 90° C. or higher, and more preferably 100° C. or higher. In the present invention, since an alcohol or glycol-based compound having a boiling point of 90° C. or higher is used as the solvent, rapid volatilization of the solvent during the surface crosslinking reaction as in the conventional method may be prevented, and thus it is easy to control the penetration depth of the surface-crosslinking agent.

Accordingly, the surface treatment step of the present invention may include the step of surface-treating the base resin with a surface treatment solution including a surface-crosslinking agent which is a diol or glycol-based compound having 2 to 8 carbon atoms, an alcohol or glycol-based compound having 3 or more carbon atoms and a boiling point of 90° C. or higher, and water.

The alcohol or glycol-based solvent having a boiling point of 90° C. or higher is similar to water in terms of its boiling point, and an alcohol or glycol-based compound having 3 or more carbon atoms may be used. Preferred examples of the alcohol or glycol-based compound may be one or more of normal-propanol, butanol, propylene glycol, and propanediol.

In the present invention, the alcohol or glycol-based solvent may also be the same as the surface-crosslinking agent.

Further, the surface-crosslinking agent may be the same as the alcohol solvents as described above, and may also be a diol or glycol-based compound having 2 to 8 carbon atoms. As the surface-crosslinking agent, an example of the diol compound may be one or more selected from the group consisting of 1,3-propanediol, 2,3,4-trimethyl-1,3-pentanediol, 2-butene-1,4-diol, 1,4-butanediol, 1,3-butanediol, 1,5-pentanediol, 1,6-hexanediol, and 1,2-cyclohexanedimethanol, and an example of the glycol compound may be one or more selected from the group consisting of monoethylene glycol, diethylene glycol, triethylene glycol, tetraethylene glycol, polyethylene glycol, propylene glycol, dipropylene glycol, polypropylene glycol, glycerol, and polyglycerol.

In the present invention, the surface treatment solution preferably includes the surface-crosslinking agent at 0.1 to 20% by weight, the alcohol or glycol-based solvent at 10 to 70% by weight, and water at a residual amount.

The surface treatment step may include the step of surface-crosslinking the mixture of the water-containing gel polymers at a temperature of 150 to 300° C. for 20 to 90 min.

Meanwhile, the superabsorbent polymer according to an embodiment of the present invention may be prepared by a method known in the art, except for the surface crosslinking process and the treatment process of the fine powder.

In an embodiment of the present invention, the water-containing gel polymer is prepared by polymerization of the monomer composition, and the base resin including the water-containing gel polymer and the base-treated fine powder regranulated body which are different from each other in degree of neutralization is obtained and then dried, as in the process of the FIGURE. Thereafter, the pulverizing and sorting processes are performed, and then the above-described surface treatment process is performed to prepare a superabsorbent polymer having uniform fine microparticles and excellent physical properties.

For example, in thermal polymerization or UV polymerization of the monomer composition, a polymerization device to be used is not particularly limited. For example, thermal polymerization may be carried out in a reactor like a kneader equipped with agitating spindles and the UV polymerization (photo-polymerization) may be carried out in a reactor equipped with a movable conveyor belt. However, the above-described polymerization method is an example, and the present invention is not limited thereto. Further, the conveyor belt may be used by rotating a belt made of a rubber, a fabric, a wire mesh, a steel sheet, or a plastic resin which is provided with slight hydrophilicity.

For example, thermal polymerization is performed by providing hot air to a reactor like a kneader equipped with agitating spindles or by heating the reactor so as to obtain the water-containing gel polymer. At this time, the water-containing gel polymer may have the size of centimeters or millimeters when it is discharged from the outlet of the reactor, according to the type of agitating spindles equipped in the reactor. Specifically, the water-containing gel polymer may be obtained in various forms according to the concentration of the monomer composition fed thereto, the feeding speed, or the like, and the water-containing gel polymer having a particle size of 2 to 50 mm may be generally obtained.

Further, when the photo-polymerization is carried out in a reactor equipped with a movable conveyor belt as described above, the water-containing gel polymer typically obtained may be a water-containing gel polymer of a sheet-type having a width of the belt. In this regard, the thickness of the polymer sheet may vary according to the concentration of the monomer composition fed thereto and the feeding speed. Preferably, the monomer composition is fed so that the polymer sheet has a thickness of about 0.5 to about 5 cm. If the monomer composition is fed so that the thickness of the sheet-type polymer becomes too thin, the production efficiency becomes low, which is not preferred. If the thickness of the sheet-type polymer exceeds 5 cm, the polymerization reaction may not uniformly occur throughout the polymer due to the excessively high thickness.

In the present invention, a superabsorbent polymer may be preferably prepared by using a device consisting of a monomer feed section having a separate transfer line and a polymerization thermal initiator feed section, in which the monomer feed section and the polymerization initiator feed section are connected to each other, and a polymerization reactor for polymerizing a monomer composition including a mixture of the monomer and the polymerization initiator. In this regard, after mixing the monomer and the crosslinking agent, a general thermal initiator may be fed to the polymerization initiator feed section, if necessary.

Further, a temperature controlling system for thermal polymerization may be equipped inside or outside of the polymerization reactor, and the internal temperature may be maintained at 60 to 100° C., and preferably at 90° C.

In the present invention, the surface treatment solution used in the surface crosslinking reaction may be applied by spraying it onto the water-containing gel polymer, but the method is not particularly limited.

Further, conditions for polymerization of the monomer composition are not particularly limited, and a method generally used in preparation of the superabsorbent polymer may be used. For example, polymerization of the monomer composition may be performed by redox polymerization at a temperature of 30 to 100° C. for 2 to 50 min, or by thermal polymerization or UV polymerization at a temperature of 40 to 90° C. for 2 to 30 min. The UV polymerization (photo-polymerization) is not greatly affected by temperature, and thus it may be performed by irradiating a light in a wide temperature range of 25 to 99° C. for 10 s to 5 min. Further, upon UV irradiation, UV intensity may be 0.1 to 30 mW/cm$^2$. A light source and wavelength range for UV irradiation are also well known to those skilled in the art.

The drying temperature and time of the polymer may be properly selected according to the water content of the prepared water-containing gel polymer, and drying is preferably performed at a temperature of 160 to 180° C. for 20 to 40 min. If the drying temperature is lower than 160° C., the drying effect is too slight and the drying time becomes excessively long, and it is difficult to lower the water content to 30% by weight or less. Further, if the drying temperature is higher than 180° C., only the surface of the water-containing gel polymer is excessively dried, and thus a large amount of fine powder may be generated during the subsequent pulverization process.

The device constitution for the drying process is not particularly limited, and for example, the drying step may be carried out by a method of irradiating infrared rays, supplying hot air, irradiating microwaves, or irradiating ultraviolet rays. Further, the drying temperature and time may be properly determined according to the thermal polymerization or the water content of the polymer which is polymerized by thermal polymerization, and preferably, the drying step may be carried at a temperature of 80 to 200° C. for 20 to 120 min. If the drying temperature is lower than 80° C., there is a problem that the drying effect is too slight and the drying time becomes excessively long. If the drying temperature is higher than 200° C., there is a problem that thermal degradation of the superabsorbent polymer occurs.

According to the present invention, in the step of pulverizing the water-containing gel polymer after drying, the dried water-containing gel polymer may be pulverized so that its particle size becomes 150 to 850 μm.

After pulverizing, the sorting process may be performed, and the sorting step may include the step of sorting the pulverized water-containing gel polymer into two kinds of particles: a particle having a particle size of smaller than 150 μm and a particle having a particle size of 150 μm or larger to 850 μm or smaller. Further, the sorting step of the present invention may be performed to sort the pulverized polymer into two or more particle sizes, if necessary.

In this regard, the dried polymer may be further pulverized, and in this case, there is no limitation in the constitution of pulverization, as long as it is a method which can be used to pulverize a polymer. Preferably, any one milling device selected from the group consisting of a pin mill, a hammer mill, a screw mill, and a roll mill may be used for pulverization. In this regard, a final superabsorbent polymer after the pulverization step may preferably have a particle size of 150 to 850 μm.

In the present invention, the water-containing gel polymer of the base resin for surface treatment has a water content of 30 to 60% by weight. The water-containing gel polymer obtained by the drying process may have a water content of 1 to 10% by weight after drying. The water content of the water-containing gel polymer means a content of water in the total weight of the water-containing gel polymer, which is obtained by subtracting the weight of the dry polymer from the weight of the water-containing gel polymer.

Further, the present invention may further include the steps of pulverizing the water-containing gel polymer and sorting the polymer into particles having a particle size of 150 to 850 μm, after surface treatment of the water-containing gel polymer.

The superabsorbent polymer prepared by the method may have about 28 to about 33 g/g of centrifugal retention capacity in a physiological saline solution, which is measured in accordance with EDANA WSP 241.2, and about 22 to about 26 g/g of absorbency under a load of 4.83 kPa (0.7 psi) in a physiological saline solution, which is measured in accordance with EDANA WAP 242.2.

The respective monomers for forming the monomer composition will now be described.

In the present invention, polymerization of the water-soluble ethylenic unsaturated monomers is preferably performed in an aqueous solution.

As the water-soluble ethylenic unsaturated monomer, any monomer may be used without limitation in the constitution, as long as it is generally used in preparation of the superabsorbent polymer. Largely, any one or more selected from the group consisting of an anionic monomer and salts thereof, a nonionic hydrophilic monomer, and an amino group-containing unsaturated monomer and a quaternary compound thereof may be used.

Specifically, the water-soluble ethylenic unsaturated monomer is preferably one or more selected from the group consisting of: an anionic monomer such as acrylic acid, methacrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, and 2-(meth)acrylamide-2-methyl propane sulfonic acid, and salts thereof; a nonionic hydrophilic monomer such as (meth)acrylamide, N-substituted (meth)acrylate, 2-hydroxyethyl(meth)acrylate, 2-hydroxypropyl(meth)acrylate, methoxy polyethylene glycol (meth)acrylate, and polyethylene glycol (meth)acrylate; and an amino group-containing unsaturated monomer such as (N,N)-dimethylaminoethyl(meth)acrylate and (N,N)-dimethylaminopropyl(meth)acrylamide, and a quaternary compound thereof. More preferably, acrylic acid or salts thereof may be used as the water-soluble ethylenic unsaturated monomer, and these monomers are preferable in that superior physical properties are achieved.

The content of the water-soluble ethylenic unsaturated monomer in the monomer composition may be properly determined according to the polymerization time and reaction conditions, and is preferably 0.01 to 1.0% by weight. If the content of the water-soluble ethylenic unsaturated monomer is less than 0.01% by weight, crosslinking concentration is low to obtain a high extractable content value. If the content is 0.1% by weight or more, it is difficult to obtain desired physical properties due to high crosslinking concentration.

The thermal polymerization initiator may be one or more selected from the group consisting of an azo-based initiator, a peroxide-based initiator, a redox-based initiator, an organic halide-based initiator, a persulfate-based initiator, acetophenone, benzoin, benzophenone, a benzyl-based compound, and derivatives thereof. The polymerization initiator may be used in an amount of 0.01 to 1.0% by weight, based on the total weight of the monomer composition.

Further, the monomer composition according to the present invention may include a crosslinking agent.

Available types of the crosslinking agent include a crosslinking agent having a water-soluble substituent of an ethylenic unsaturated monomer, at least one functional group capable of reacting with a water-soluble substituent of an ethylenic unsaturated monomer and further having at least one ethylenic unsaturated group or a mixture thereof; and a crosslinking agent having a water-soluble substituent of the ethylenic unsaturated monomer, at least two functional groups capable of reacting with a water soluble substituent group generated from hydrolysis of a vinyl monomer, and a mixture thereof. The crosslinking agent having at least two ethylenic unsaturated groups may be any one or more selected from the group consisting of bis-acrylamide having 8 to 12 carbon atoms, bis-methacrylamide, poly(meth)acrylate of polyol having 2 to 10 carbon atoms, and poly(meth) allylether of polyol having 2 to 10 carbon atoms; and N,N'-methylenebis(meth)acrylate, ethyleneoxy(meth)acrylate, polyethyleneoxy(meth)acrylate, propyleneoxy(meth)acrylate, glycerin diacrylate, glycerin triacrylate, trimethylolpropane triacrylate, triallylamine, triarylcyanurate, triallylisocianate, polyethylene glycol, diethylene glycol, and propylene glycol.

The crosslinking agent used in the preparation of the water-containing gel polymer may be used in an amount of 0.01 to 0.5% by weight, based on the total weight of the monomer composition.

Hereinafter, the action and effect of the present invention will be described in more detail with reference to specific examples of the present invention. However, these examples are for illustrative purposes only, and the scope of the present invention is not intended to be limited thereby.

PREPARATION EXAMPLES 1 TO 4

100 g of acrylic acid, 0.5 g of polyethylene glycol diacrylate (Mw=523) as a crosslinking agent, 83.3 g of 50% caustic soda (NaOH), and 89.8 g of water were mixed to prepare a monomer aqueous composition having a monomer concentration of 45% by weight.

Subsequently, 810 g of the monomer aqueous composition was mixed with 30.54 g of an ascorbic acid solution and 33 g of a 1% sodium persulfate solution, and the mixture was fed through a feed section of a continuous polymerization reactor with a kneader, together with 30.45 g of a 0.15% hydrogen peroxide solution, so as to perform polymerization. At this time, temperature of the reactor was maintained at 80° C., and the maximum polymerization temperature was 110° C. and the polymerization time was 1 min and 15 s. Thereafter, kneading was continuously performed, and polymerization and kneading were performed for 20 min. The polymers having a size of 0.2 cm or smaller were thus distributed. At this time, the water content of the water-containing gel polymer finally formed was 51% by weight.

Subsequently, the water-containing gel polymer was dried with a hot air dryer at 160° C. for 30 min, and the dried water-containing gel polymer was pulverized with a pin mill. Next, the polymer was sorted into a polymer having a particle size (average particle size) of smaller than 150 μm and a polymer having a particle size of 150 μm to 850 μm by using a sieve. Through these procedures, a base resin was prepared. The fine powder of 150 μm or smaller which was prepared by the procedures was set aside for regranulation.

Then, a surface treatment solution including 5% by weight of 1,3-propanediol, 5% by weight of propylene glycol, and water at a residual amount was sprayed onto the prepared base resin to perform surface treatment of the superabsorbent polymer. Further, in the surface treatment step, the sorted water-containing gel polymers were fed to one surface crosslinking reactor, and then surface crosslinking reaction of the water-containing gel polymers was performed at 190° C. or higher for 20 to 50 min, respectively.

After completion of the surface treatment, surface treated-superabsorbent polymers having an average particle size of 150 to 850 μm (Preparation Examples 1 to 4) were obtained by passing the water-containing gel polymers through a sieve. The content of fine powder having a particle size of 150 μm or smaller in the respective superabsorbent polymers was less than 2%. The fine powder of 150 μm or smaller which was generated by the above procedures was set aside for regranulation.

EXAMPLES 1 TO 5

In preparation of the base resin, 65% by weight of the base resin of fine powder having a particle size of 150 μm or smaller, which was generated during the preparation process of Preparation Example 1, and 35% by weight of the surface-treated fine powder were mixed and regranulation was performed using 5% by weight of a NaOH solution at a water content of 51% by weight. 85% by weight of the water-containing gel polymer formed by polymerization and 15% by weight of the base-treated fine powder regranulated body were mixed. Thereafter, a surface crosslinking reaction of the water-containing gel polymer was performed by surface treatment at a temperature of 190° C. or higher for 10 to 50 min, respectively.

EXAMPLES 6 TO 10

Superabsorbent polymers were prepared in the same manner as in Examples 1 to 5, except that 10% by weight of the NaOH solution was used as a solution for fine powder regranulation.

COMPARATIVE EXAMPLES 1 TO 5

Superabsorbent polymers were prepared in the same manner as in Examples 1 to 5, except that pure water was used as a solution for fine powder regranulation.

EXPERIMENTAL EXAMPLE

Test of Physical Properties of Superabsorbent Polymer (1) Particle Size
The particle size of the base resins and the superabsorbent polymers used in the examples and comparative examples was measured according to EDANA WSP 220.2. The results are given in Table 1.
(2) Absorbency Under Pressure (AUP)
Absorbency under pressure was measured for the superabsorbent polymers of the examples and comparative examples according to EDANA WAP 242.2.
The measurement method of absorbency under pressure (AUP) is as follows.
A 400 mesh stainless steel net was installed in the bottom of a plastic cylinder having an internal diameter of 60 mm. 0.90 g of the absorbent polymer was uniformly scattered on the steel net at room temperature and humidity of 50%, and a piston which can provide a load of 4.83 kPa (0.7 psi) uniformly was put thereon, in which the external diameter of the piston was slightly smaller than 60 mm, there was no gap between the internal wall of the cylinder and the piston, and the jig-jog of the cylinder was not interrupted. In this regard, the weight Wa(g) of the device was measured.

After putting a glass filter having the diameter of 90 mm and the thickness of 5 mm in a Petri dish having a diameter of 150 mm, a physiological saline solution composed of 0.90% by weight of sodium chloride was poured in the dish until the surface level became equal to the upper surface of the glass filter. A sheet of filter paper having the diameter of 90 mm was put thereon. The measuring device was put on the filter paper and the solution was absorbed for 1 h under the load. After 1 h, the weight Wb(g) was measured after lifting the measuring device up.

The absorbency under pressure was calculated from Wa and Wb according to the following Equation 1:

$$AUP(g/g)=[Wb(g)-Wa(g)]/\text{weight of absorbent polymer}(g) \quad \text{[Equation 1]}$$

wherein Wa(g) is the total weight of the absorbent polymer and the apparatus capable of providing a load for the absorbent polymer, and Wb(g) is the total weight of the water-absorbed absorbent polymer after supplying water for the absorbent polymer under a load of 4.83 kPa (0.7 psi) for 1 h, and the apparatus capable of providing a load for the absorbent polymer.

(3) Absorption Capacity Under No Load (CRC, Centrifuge Retention Capacity)

Retention capacity by absorbency under no load was measured for the superabsorbent polymers of the examples and comparative examples according to EDANA WSP 241.2.

That is, the polymer W(g) (about 0.1 g) obtained in the examples and comparative examples was uniformly placed into a nonwoven-fabric-made bag, followed by sealing. Then, the bag was immersed into 0.9% by weight of physiological saline solution at room temperature. 30 min later, the bag was drained at 250 G for 3 min with a centrifuge, and the weight $W_2(g)$ of the bag was then measured. Further, the same procedure was carried out using no absorbent polymer, and the resultant weight $W_1(g)$ was measured. Thus, CRC (g/g) was calculated from these weights thus obtained according to the following Equation:

$$CRC(g/g)=\{(W_2(g)-W_1(g))/W(g)\}-1 \quad \text{[Equation 2]}$$

wherein W (g) is the weight (g) of the absorbent polymer, $W_1(g)$ is the weight of the apparatus, which is measured after draining water off at 250 G for 3 min with a centrifuge using no absorbent polymer, and $W_2(g)$ is the weight of the apparatus including the absorbent polymer, which is measured after immersing the absorbent polymer in 0.9% by weight of the physiological saline solution at room temperature for 30 min and draining water off at 250 G for 3 min with a centrifuge.

(4) Extractable Content (EC)
Extractable content was measured according to the order and method disclosed in EDANA WSP 270.2. The degree of neutralization mentioned in the present invention is a degree of neutralization calculated by the equation which is used for measuring the extractable content.

TABLE 1

|  |  | Preparation Example 1 | Preparation Example 2 | Preparation Example 3 | Preparation Example 4 |
|---|---|---|---|---|---|
| Polymer | CRC | 33.8 | 33.7 | 33.8 | 33.8 |
|  | Extractable content | 10.7 | 10.7 | 10.7 | 10.7 |
|  | Degree of neutralization (%) | 73 | 73 | 73 | 73 |

TABLE 1-continued

|  |  | Preparation Example 1 | Preparation Example 2 | Preparation Example 3 | Preparation Example 4 |
|---|---|---|---|---|---|
| Base resin | CRC | 33.8 | 33.8 | 33.8 | 33.8 |
|  | EC | 10.7 | 10.7 | 10.7 | 10.7 |
| Surface crosslinking | Reaction time | 20 | 30 | 40 | 50 |
| Final polymer product | CRC | 329 | 32.0 | 28.5 | 28.9 |
|  | AUP | 8.22 | 14.9 | 24.9 | 24.22 |

TABLE 2

|  |  | Example 1 | Example 2 | Example 3 | Example 4 | Example 5 |
|---|---|---|---|---|---|---|
| Fine powder regranulated product | NaOH Conc. (%) | 5 | 5 | 5 | 5 | 5 |
|  | CRC | 24.1 | 24.1 | 24.1 | 24.1 | 24.1 |
|  | E/C | 1254 | 1254 | 1254 | 1254 | 1254 |
|  | Degree of neutralization (%) | 80 | 80 | 80 | 80 | 80 |
| Polymer | CRC | 33.8 | 33.8 | 33.8 | 33.8 | 33.8 |
|  | EC | 10.7 | 10.7 | 10.7 | 10.7 | 10.7 |
|  | Degree of neutralization (%) | 73 | 73 | 73 | 73 | 73 |
| Base resin | CRC | 323 | 323 | 323 | 323 | 323 |
|  | EC | 10.7 | 10.7 | 10.7 | 10.7 | 10.7 |
| Surface crosslinking | Reaction time | 10 | 20 | 30 | 40 | 50 |
| Final polymer product | CRC | 329 | 32.0 | 28.5 | 28.9 | 27.9 |
|  | AUP | 8.22 | 14.9 | 24.9 | 24.22 | 24.53 |

TABLE 3

|  |  | Example 6 | Example 7 | Example 8 | Example 9 | Example 10 |
|---|---|---|---|---|---|---|
| Fine powder regranulated product | NaOH Conc. (%) | 10 | 10 | 10 | 10 | 10 |
|  | CRC | 26.8 | 26.8 | 26.8 | 26.8 | 26.8 |
|  | E/C | 14.4 | 14.4 | 14.4 | 14.4 | 14.4 |
|  | Degree of neutralization (%) | 83 | 83 | 83 | 83 | 83 |
| Polymer | CRC | 33.8 | 33.8 | 33.8 | 33.8 | 33.8 |
|  | EC | 10.7 | 10.7 | 10.7 | 10.7 | 10.7 |
|  | Degree of neutralization (%) | 73 | 73 | 73 | 73 | 73 |
| Base resin | CRC | 32.2 | 32.2 | 32.2 | 32.2 | 32.2 |
|  | EC | 11.4 | 11.4 | 11.4 | 11.4 | 11.4 |
| Surface crosslinking | Reaction time | 10 | 20 | 30 | 40 | 50 |
| Final polymer product | CRC | 33.2 | 32.3 | 28.4 | 28.3 | 27.7 |
|  | AUP | 8.56 | 16.6 | 23.6 | 22.99 | 22.33 |

TABLE 4

|  |  | Comparative Example 1 | Comparative Example 2 | Comparative Example 3 | Comparative Example 4 | Comparative Example 5 |
|---|---|---|---|---|---|---|
| Fine powder regranulated product | NaOH Conc. (%) | 0 | 0 | 0 | 0 | 0 |
|  | CRC | 23.5 | 23.5 | 23.5 | 23.5 | 23.5 |
|  | E/C | 12 | 12 | 12 | 12 | 12 |
|  | Degree of neutralization (%) | 74 | 74 | 74 | 74 | 74 |

TABLE 4-continued

| | | Comparative Example 1 | Comparative Example 2 | Comparative Example 3 | Comparative Example 4 | Comparative Example 5 |
|---|---|---|---|---|---|---|
| Polymer | CRC | 33.8 | 33.8 | 33.8 | 33.8 | 33.8 |
| | EC | 10.7 | 10.7 | 10.7 | 10.7 | 10.7 |
| | Degree of neutralization (%) | 73 | 73 | 73 | 73 | 73 |
| Base resin | CRC | 32.1 | 32.1 | 32.1 | 32.1 | 32.1 |
| | EC | 11 | 11 | 11 | 11 | 11 |
| Surface crosslinking | Reaction time | 20 | 30 | 40 | 50 | 60 |
| Final polymer product | CRC | 30.7 | 29.1 | 26.2 | 26.2 | 25.5 |
| | AUP | 20.7 | 24.7 | 22.69 | 22.52 | 22.08 |

As shown in Tables 1 to 4, the examples of the present invention provide superabsorbent polymers having excellent physical properties, compared to the comparative examples.

In Preparation Examples 1 to 4, the polymer itself was used to prepare the base resins, which exhibited excellent physical properties. However, considering the efficiency and cost in a practical process, use of fine powder regranulated product is inevitable.

As shown in Examples 1 to 10, however, when the fine powder regranulated products were regranulated using the NaOH solution, their degree of neutralization was higher than those of the polymers. A mixture of two materials with different degrees of neutralization was found to be present in the base resin which is used in the final surface crosslinking.

In particular, deterioration in physical properties according to the reaction time was low in the examples, compared to Comparative Examples 1 to 5, indicating that physical properties were stable in a wide range, thereby securing stable physical properties of the final product.

The invention claimed is:

1. A method of preparing a superabsorbent polymer, comprising the steps of:
    forming a monomer composition including water-soluble ethylenic unsaturated monomers and a polymerization initiator;
    polymerizing the monomer composition in a polymerization reactor so as to prepare a water-containing gel polymer;
    drying, pulverizing and performing a first sorting step including sorting the water-containing gel polymer obtained from the polymerizing step to obtain a fine powder having a particle size of smaller than 150 μm;
    obtaining a base-treated fine powder regranulated body by treating the sorted fine powder having the particle size of smaller than 150 μm from the first sorting step, followed by regranulation, wherein the alkaline solution is one or more solutions selected from the group consisting of NaOH, $Na_2CO_3$, and $NaHCO_3$ having a concentration of 1 to 10% by weight;
    mixing the water-containing gel polymer and the base-treated fine powder regranulated body which are different from each other in degree of neutralization;
    drying and pulverizing a mixture of the water-containing gel polymer and the base-treated fine powder regranulated body;
    performing a second sorting step including sorting the pulverized mixture into two kinds of particles having different particle size distributions: (1) particles having a particle size of smaller than 150 μm and (2) particles having a particle size ranging from 150 μm to 850 μm;
    preparing a base resin including the water-containing gel polymer and the particles having a particle size ranging from 150 μm to 850 μm from the second sorting step; and
    surface-treating the base resin with a surface treatment solution to obtain a superabsorbent polymer having a particle size ranging from 150 μm to 850 μm,
    wherein the water-containing gel polymer has a degree of neutralization of 70 to 80 mol %, and
    the base-treated fine powder regranulated body has a degree of neutralization of 71 to 100 mol %.

2. The method of claim 1, wherein the water-containing gel polymer and the base-treated fine powder regranulated body have a water content of 40 to 60% by weight.

3. The method of claim 1, wherein the water-containing gel polymer and the base-treated fine powder regranulated body are mixed at a weight ratio of 95:5 to 70:30.

4. The method of claim 1, wherein the surface treatment step solution in the step of surface-treating the base resin comprises: a surface-crosslinking agent,; a solvent, and water,
    wherein the surface cross-linking agent is a diol or a glycol-based compound having 2 to 8 carbon atoms, and
    the solvent is an alcohol or a glycol-based compound having 3 or more carbon atoms and a boiling point of 90° C. or higher.

5. The method of claim 4, wherein the surface treatment solution includes the surface-cross linking agent at 0.1 to 20% by weight, the solvent at 10 to 70% by weight, and water at a residual amount.

6. The method of claim 1, wherein the surface treatment step includes the step of surface-crosslinking the base resin at a temperature of 150 to 300 ° C. for 20 to 90 min.

7. The method of claim 4, wherein the surface-crosslinking agent is one or more selected from the group consisting of 1,3-propanediol, 2,3,4-trimethyl-1,3-pentanediol, 2-butene-1,4-diol, 1,4-butanediol, 1,3-butanediol, 1,5-pentanediol, 1,6-hexanediol, 1,2-cyclohexanedimethanol, monoethylene glycol, diethylene glycol, triethylene glycol, tetraethylene glycol, polyethylene glycol, propylene glycol, dipropylene glycol, polypropylene glycol, glycerol, and polyglycerol.

8. The method of claim 4, wherein the alcohol or glycol-based compound is one or more selected from the group consisting of normal-propanol, butanol, propylene glycol, and 1,3-propanediol.

9. The method of claim 1, wherein the water-soluble ethylenic unsaturated monomer is one or more selected from a group consisting of: an anionic monomer such as acrylic acid, methacrylic acid, maleic anhydride, fumaric acid, crotonic acid, itaconic acid, 2-acryloylethane sulfonic acid, 2-methacryloylethane sulfonic acid, 2-acryloylpropane sulfonic acid, 2-methacryloylpropane sulfonic acid, 2-acrylamide-2-methyl propane sulfonic acid, 2-methacrylamide-2-methyl propane sulfonic acid and anionic monomer salts thereof; acrylamide, methacrylamide, N-substituted acrylate, N-substituted methacrylate, 2-hydroxyethyl acrylate, 2-hydroxyethyl methacrylate, 2-hydroxypropyl acrylate, 2-hydropropyl methacrylate, methoxy polyethylene glycol acrylate, methoxy polyethylene glycol methacrylate, polyethylene glycol acrylate, polyethylene glycol methacrylate; and (N,N)-dimethylaminoethyl acrylate, (N,N)-dimethylaminoethyl methacrylate, (N,N)-dimethylaminopropylacrylamide, (N,N)-dimethylaminopropyl methacrylamide and quaternary compounds thereof.

10. The method of claim 1, wherein the polymerization initiator is any one selected from the group consisting of an azo-based initiator, a peroxide-based initiator, a redox-based initiator, an organic halide-based initiator, a persulfate-based initiator, acetophenone, benzoin, benzophenone, a benzyl-based compound, and derivatives thereof.

* * * * *